(12) United States Patent
Sengupta et al.

(10) Patent No.: US 8,455,580 B2
(45) Date of Patent: Jun. 4, 2013

(54) MEDIUM VOLTAGE CABLE INSULATION

(75) Inventors: Saurav S. Sengupta, Somerset, NJ (US);
Timothy J. Person, Freehold, NJ (US);
Jeffrey M. Cogen, Flemington, NJ (US);
Paul J. Caronia, Annadale, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 281 days.

(21) Appl. No.: 12/966,080

(22) Filed: Dec. 13, 2010

(65) Prior Publication Data

US 2011/0147041 A1 Jun. 23, 2011

Related U.S. Application Data

(60) Provisional application No. 61/288,551, filed on Dec. 21, 2009.

(51) Int. Cl.
*C08K 5/00* (2006.01)

(52) U.S. Cl.
USPC ....................................................... 524/236

(58) Field of Classification Search
USPC ....................................................... 524/236
See application file for complete search history.

(56) References Cited

U.S. PATENT DOCUMENTS

| | | |
|---|---|---|
| 4,018,852 A | 4/1977 | Schober |
| 4,305,849 A | 12/1981 | Kawasaki et al. |
| 4,857,600 A | 8/1989 | Gross et al. |
| 4,870,121 A | 9/1989 | Bamji et al. |
| 5,187,009 A | 2/1993 | Kimura et al. |
| 5,246,783 A | 9/1993 | Spenadel et al. |
| 5,272,236 A | 12/1993 | Lai et al. |
| 5,278,272 A | 1/1994 | Lai et al. |
| 5,346,961 A | 9/1994 | Shaw et al. |
| 5,575,965 A | 11/1996 | Caronia et al. |
| 5,986,028 A | 11/1999 | Lai et al. |
| 6,455,616 B1 | 9/2002 | Cogen |
| 6,496,629 B2 | 12/2002 | Ma et al. |
| 6,714,707 B2 | 3/2004 | Rossi et al. |
| 6,858,296 B1 | 2/2005 | Mendelsohn et al. |
| 6,869,995 B2 | 3/2005 | Caronia et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 7,579,408 B2 | 8/2009 | Walton et al. |
| 7,582,716 B2 | 9/2009 | Liang et al. |
| 2006/0160014 A1* | 7/2006 | Nagahara et al. .......... 430/270.1 |
| 2009/0043012 A1* | 2/2009 | Easter ........................... 523/173 |

FOREIGN PATENT DOCUMENTS

| | | |
|---|---|---|
| WO | 2006131264 | 12/2006 |
| WO | 2007123331 | 11/2007 |
| WO | 2009021050 | 2/2009 |

\* cited by examiner

*Primary Examiner* — Ling Choi
*Assistant Examiner* — Lanee Reuther
(74) *Attorney, Agent, or Firm* — Whyte Hirschboeck Dudek SC

(57) ABSTRACT

Compositions comprising:
  A. Ethylene-based polymer, e.g., LDPE;
  B. Polyalkylene glycol, e.g., PEG;
  C. Tertiary hindered amine stabilizer;
  D. Sulphur-containing hindered phenol antioxidant;
  E. Peroxide; and
  F. Optional coagent
are useful in the preparation of TRXLPE insulation for medium voltage cable that exhibits a commercially desirable balance of long term heat aging retardancy and water-tree resistance.

9 Claims, No Drawings

MEDIUM VOLTAGE CABLE INSULATION

CROSS REFERENCE TO RELATED APPLICATION

This application claims priority to U.S. patent application No. 61/288,551 filed on Dec. 21, 2009, the entire content of which is incorporated by reference herein.

FIELD OF THE INVENTION

This invention relates to wire and cable insulation. In one aspect the invention relates to insulation for medium voltage wire and cable while in another aspect, the invention relates to such insulation that exhibits a commercially desirable balance of water-tree resistance and long-term heat aging resistance.

BACKGROUND OF THE INVENTION

Electrical insulation applications are generally divided into low voltage insulation which are those less than 5K volts, medium voltage insulation which ranges from 5K volts to 60K volts, and high voltage insulation, which is for applications above 60K volts.

For medium voltage cable applications, the most common polymeric insulators are made from an ethylene-based polymer, typically either from polyethylene or ethylene-propylene elastomers, otherwise known as ethylene-propylene-rubber (EPR). The polyethylene can be any one or more of a number of various polyethylenes, e.g., homo- or copolymer, high density polyethylene (HDPE), high pressure low density polyethylene (LDPE), linear low density polyethylene (LLDPE), and the like. The polyethylenes are typically crosslinked, usually through the action of a peroxide, but are still prone to treeing, particularly water treeing.

Water treeing is the deterioration of a solid dielectric material which is simultaneously exposed to moisture and an electric field. It is a significant factor in determining the useful life of buried power cables. Water trees initiate from sites of high electrical stress such as rough interfaces, protruding conductive points, voids, or imbedded contaminants but at a lower field than that required for electrical trees. In contrast to electrical trees, water trees are characterized by: (a) the presence of water (which is essential for their growth); (b) long term growth (they can grow for years before reaching a size at which they may contribute to a breakdown); and (c) growth is initiated and continued in a much lower electrical field than that required for the initiation and growth of electrical trees.

Water treeing is accepted as a factor in wet-electrical aging of insulation in power cable designs which are not water impervious. Water tree retardancy of insulation materials is brought about by the use of additives such as polyethylene glycol (PEG) or the incorporation of a polar ethylene copolymer, e.g., ethylene vinyl acetate (EVA), ethylene ethyl acrylate (EEA) and the like.

Thermo-oxidative damage during long term aging is another mode of failure of medium voltage cables. Retardancy of this unwanted phenomenon is typically achieved through a combination of peroxide-initiated crosslinking the ethylene-based polymer and the use of a sulphur containing hindered phenol stabilizer. Hindered amine stabilizers are known for their use as thermo-oxidative stabilizers and inhibitors of electrical trees, a form of electrical degradation. However, a known antagonism exists between amine and sulphur based molecules that restrict their combined use in systems that required both good long term heat aging retardancy and water-tree and electrical-tree resistance. Moreover, PEG is a known pro-degradant with respect to thermo-oxidative stability in tree resistant, crosslinked polyethylene (TRXLPE) insulation, and thus these systems require a greater degree of stabilization than is required of non-tree resistant crosslinked polyethylene insulation.

SUMMARY OF THE INVENTION

In one embodiment the invention is a composition comprising:
  A. Ethylene-based polymer;
  B. Polyalkylene glycol;
  C. Tertiary hindered amine stabilizer;
  D. Sulphur-containing hindered phenol antioxidant;
  E. Peroxide; and
  F. Optional coagent.

The peroxide and optional coagent together constitute a cure package. These compositions are useful for the preparation of TRXLPE insulation for medium voltage cable that exhibits a commercially desirable balance of long term heat aging retardancy and water- and electrical-tree resistance.

In one embodiment the invention is a composition comprising, in weight percent (wt %) based on the weight of the composition:
  A. 10-99 wt % Ethylene-based polymer;
  B. 0.1-1 wt % Polyalkylene glycol;
  C. 0.1-1 wt % Tertiary hindered amine stabilizer;
  D. 0.1-1 wt % Sulphur-containing hindered phenol antioxidant;
  E. 0.1-3 wt % Peroxide; and
  F. 0-1 wt % Coagent.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 0.9, 1.1, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of various components in the inventive composition, and the various characteristics and properties by which these compositions and the wire and cable sheathing made from these compositions are defined.

"Wire" and like terms mean a single strand of conductive metal, e.g., copper or aluminum, or a single strand of optical fiber.

"Cable", "power cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

"Polymer" and like terms means a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Ethylene-based polymer" and like terms means a polymer containing, in polymerized form, a majority weight percent of units derived from ethylene based on the total weight of the polymer. Nonlimiting examples of ethylene-based polymers include low density polyethylene (LDPE), linear low density polyethylene (LLDPE), very low density polyethylene (VLDPE), ultra low density polyethylene (ULDPE), medium density polyethylene (MDPE), high density polyethylene (HDPE), and functionalized polyethylene, e.g., ethylene vinyl acetate (EVA), ethylene ethyl acrylate (EEA), and the like.

Ethylene-Based Polymer

The ethylenic polymers used in the practice of this invention include both homopolymers and interpolymers, random and blocky copolymers, and functionalized (e.g., ethylene vinyl acetate, ethylene ethyl acrylate, etc.) and non-functionalized polymers. The ethylenic interpolymers include elastomers, flexomers and plastomers. The ethylene polymer comprises at least 50, preferably at least 60 and more preferably at least 80, wt % of units derived from ethylene. The other units of the ethylenic interpolymer are typically derived from one or more α-olefins.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative ethylenic interpolymers include copolymers of ethylene/propylene, ethylene/butene, ethylene/1-hexene, ethylene/1-octene, ethylene/styrene, and the like. Illustrative ethylenic terpolymers include ethylene/propylene/1-octene, ethylene/propylene-/butene, ethylene/butene/1-octene, ethylene/propylene/diene monomer (EPDM) and ethylene/butene/styrene.

Examples of ethylenic polymers useful in the practice of this invention include high density polyethylene (HDPE); medium density polyethylene (MDPE); low density polyethylene (LDPE); very low density polyethylene (VLDPE); homogeneously branched, linear ethylene/α-olefin copolymers (e.g. TAFMER® by Mitsui Petrochemicals Company Limited and EXACT® by DEX-Plastomers); homogeneously branched, substantially linear ethylene/α-olefin polymers (e.g., AFFINITY® polyolefin plastomers and ENGAGE® polyolefin elastomers available from The Dow Chemical Company); and ethylene block copolymers (INFUSE® also available from The Dow Chemical Company). The substantially linear ethylene copolymers are more fully described in U.S. Pat. Nos. 5,272,236, 5,278,272 and 5,986,028, and the ethylene block copolymers are more fully described in U.S. Pat. Nos. 7,579,408, 7,355,089 7,524,911, 7,514,517, 7,582,716 and 7,504,347.

Olefinic interpolymers of particular interest for use in the practice of this invention are LDPE, linear low density polyethylene (LLDPE) and HDPE. These ethylenic copolymers are commercially available from a number of different sources including The Dow Chemical Company under such trademarks as DOWLEX™, ATTANE™ and FLEXOMER™.

One preferred polymer is a high pressure low density polyethylene (LDPE). One conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of 10,000 to 30,000 psi (70 to 210 kPa) and the temperature is in the range of 175 to 250° C., and in the tubular reactor, the pressure is in the range of 25,000 to 45,000 psi (170 to 310 kPa) and the temperature is in the range of 200 to 350° C.

The amount of ethylene polymer present in the compositions of this invention can vary widely, but the amount is typically of 10 to 99, more typically 50-99 and even more typically 80-99, wt % based on the total weight of the composition. The ethylene polymer can be present as a single polymer, e.g., LDPE, or as a blend of two or more polymers, e.g., LDPE and MDPE.

Polyalkylene Glycol

The polyalkylene glycols used in the practice of this invention are known compounds, and they are made by the polymerization of an alkylene oxide monomer or a mixture of alkylene oxide monomers initiated by one or more of water and a mono-, di- or polyhydric compound, and promoted by a base catalyst under reactive conditions known in the art (see, for example, "Alkylene Oxides and Their Polymers", Surfactant Science Series, Vol 35). Upon the completion of the polymerization, the reaction mixture is vented and then neutralized by the addition of one or more acids. Optionally, the salts resulting from the neutralization can be removed by any known means. The neutralized polyalkylene glycol product has a pH value of 4.0 to 8.5. For purposes of this invention, "polyalkylene glycol" includes dialkylene glycol, and specifically diethylene glycol.

In one embodiment the initiator is ethylene or propylene glycol or an oligomer of one of them. In one embodiment, the initiator is a compound of the formula

$$R^1O-(CHR^2CH_2O)_m-R^3$$

in which $R^1$ and $R^3$ are independently a $C_1$ to $C_{20}$ aliphatic or aromatic group with linear or branched structure and which may contain one or more unsaturated bonds, or hydrogen, with the proviso that at least one of $R^1$ and $R^3$ is hydrogen; each $R^2$ is independently hydrogen, methyl, or ethyl; and m is an integer of 0 to 20. In one embodiment the starter compound is a hydrocarbon compound containing 3 or more hydroxyl groups, such as glycerol or sorbitol.

In one embodiment, the catalyst is a base, typically at least one of an alkali or alkaline earth metal hydroxide or carbonate, aliphatic amine, aromatic amine, or a heterocyclic amine. In one embodiment, sodium or potassium hydroxide is the base catalyst.

The alkylene oxide used as the monomer in the polymerization is a $C_2$ to $C_8$ oxide, such as ethylene oxide, propylene oxide, butylene oxide, hexene oxide, or octene oxide. In one embodiment, the alkylene oxide is ethylene or propylene oxide.

In one embodiment of this invention the polyalkylene oxide is polyethylene oxide, or a water soluble copolymer of ethylene oxide (EO) and propylene oxide (PO), or a mono methyl, ethyl, propyl, or butyl ether of one of them, or a polyethylene oxide or a copolymer of EO and PO initiated by glycerol. In one embodiment, the polyalkylene glycol is polyethylene glycol with a weight average molecular weight (Mw) of 1,000 to 50,000, more typically of 10,000-40,000 and even more typically of 15,000 to 35,000, g/mole.

Tertiary Hindered Amine Stabilizer

Tertiary hindered amine stabilizers include hindered amine light stabilizers (HALS). Representative HALS that can be used in the compositions of this invention include, but are not limited to, TINUVIN XT 850, TINUVIN 622, TINUVIN® 144, SANDUVOR® PR-31 and Chimassorb 119 FL. TINUVIN® 144 is bis-(1,2,2,6,6-pentamethyl-4-piperidinyl)-2-n-butyl-2-(3,5-di-tert-butyl-4-hydroxybenzyl)malonate, has a molecular weight of about 685 grams/mole, contains tertiary amines, and is also available from Ciba. SANDUVOR® PR-31 is propanedioic acid, [(4-methoxyphenyl)-methylene]-bis-(1,2,2,6,6-pentamethyl-4-piperidinyl)ester, has a molecular weight of about 529 grams/mole, contains tertiary amines, and is available from Clariant Chemicals (India) Ltd. Chimassorb 119 FL or Chimassorb 119 is 10 wt % of dimethyl succinate polymer with 4-hydroxy-2,2,6,6,-tetramethyl-1-piperidineethanol and 90 wt % of N,N'''-[1,2-Ethanediylbis[[[4,6-bis[butyl(1,2,2,6,6-pentamethyl-4-piperidinyl)amino]-1,3,5-traizin-2-yl]imino]-3,1-propanediyl]]bis[N'N''-dibutyl-N'N''-bis(1,2,2,6,6-pentamethyl-4-piperidinyl)]-1 and is commercially available from Ciba Inc. In one embodiment the tertiary hindered amine stabilizer is present in the composition in an amount of 0.1 to 1, more typically in an amount of 0.1 to 0.5 and even more typically in an amount of 0.1 to 0.3, weight percent.

Sulphur-Containing Hindered Phenol Antioxidant

Examples of sulphur-containing hindered phenol antioxidants include, but are not limited to: bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate. In one embodiment the sulphur-containing hindered phenol antioxidant is present in the composition in an amount of 0.1 to 1, more typically in an amount of 0.1 to 0.5 and even more typically in an amount of 0.2 to 0.4, weight percent.

Cure Package

The cure package comprises a peroxide initiator and, optionally, a coagent. Examples of the peroxide initiator include dicumyl peroxide; bis(alpha-t-butyl-peroxyisopropyl)benzene; isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)3,3,5-trimethylcyclohexane; isopropylcumyl cumylperoxide; di(isopropylcumyl) peroxide; and mixtures of two or more such initiators. Peroxide curing agents are used typically in amounts of 0.1 to 3, more typically 0.5 to 3 and even more typically 1 to 2.5, wt % based on the weight of the composition. Various curing coagents (as well as boosters or retarders) can be used in combination with the peroxide initiator, and these include triallyl isocyanurate; ethoxylated bisphenol A dimethacrylate; α-methyl styrene dimer (AMSD); and the other co-agents described in U.S. Pat. Nos. 5,346,961 and 4,018,852. Coagents are used, if used at all, typically in amounts of greater than 0 (e.g., 0.01) to 3, more typically 0.1 to 0.5 and even more typically 0.2 to 0.4, wt % based on the weight of the composition.

Fillers and Additives

The composition may contain additives including but not limited to processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators. Additives, other than fillers, are typically used in amounts ranging from 0.01 or less to 10 or more wt % based on the weight of the composition. Fillers are generally added in larger amounts although they the amount can range from as low as 0.01 or less to 50 or more wt % based on the weight of the composition. Examples of fillers include but are not limited to clays, precipitated silica and silicates, fumed silica, calcium carbonate, ground minerals, and carbon blacks with typical arithmetic mean particle sizes larger than 15 nanometers.

Compounding and Fabrication

Compounding of a cable insulation material can be effected by standard equipment known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder.

A cable containing an insulation layer comprising a composition of the invention can be prepared with various types of extruders, e.g., single or twin screw types. A description of a conventional extruder can be found in U.S. Pat. No. 4,857,600. An example of co-extrusion and an extruder therefore can be found in U.S. Pat. No. 5,575,965. A typical extruder has a hopper at its upstream end and a die at its downstream end. The hopper feeds into a barrel, which contains a screw. At the downstream end, between the end of the screw and the die, there is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating where the polymeric insulation is crosslinked after extrusion, the cable often passes immediately into a heated vulcanization zone downstream of the extrusion die. The heated cure zone can be maintained at a temperature in the range of about 200 to about 350 C, preferably in the range of about 170 to about 250 C. The heated zone can be heated by pressurized steam, or inductively heated pressurized nitrogen gas.

The invention is illustrated by the following examples.

Specific Embodiments

Test Methods

All formulations are tested for cure in a moving die rheometer according to ASTM D-5289. Tests are run at 180° C. for 15 minutes and at 140° C. for 120 minutes. Hot-creep experiments conducted according to ICEA T-28-562 at 150° C. measure the extent of crosslinking of these samples.

Mechanical properties of the samples are tested according to ASTM D-882 and ASTM D-638 after aging for 3 weeks at 136° C.

The active tree retardant additive is PEG, and it is present in the same amount in all the examples. Water treeing is initiated in the test plaques according to ASTM D-6097 and the tree length is measured.

Characterization of the wet electrical aging performance is achieved through the use of cured 40-mil plaques which are clamped in between two halves of a "U-tube". Each side of the U-tube is filled with 0.01M sodium chloride (NaCl) solution to provide a conductive media between metallic electrodes and the sample. Samples are energized at 6 kV with 1 kHz AC for 21-days, after which the breakdown strength of the sample is measured using a 0.5 kV/s ramp according to ASTM D-149. Samples are compared in terms of the retention of breakdown strength after aging. Samples containing a hindered amine stabilizer show higher retention of breakdown strength compared to samples without a tertiary hindered amine stabilizer.

Materials

DXM-446 is used in all the examples, and it is a low density polyethylene (LDPE) with an MI of 2.3 g/10 min (ASTM D-1238, (190° C./2.16 kg) and a density of 0.92 g/cc (ASTM D-792) available from The Dow Chemical Company.

Clariant 20000 is also used in all examples, and it is a polyethylene glycol with a Mw of 20,000 available from Clariant AG.

Irganox 1035 is thiodiethylene bis(3,5-di-tert-butyl-4-hydroxyhydrocinnamate) available from Ciba Inc.

Irganox 1010 is pentaerythritol tetrakis(3-(3,5-di-tert-butyl-4-hydroxyphenyl)-propionate) available from Ciba Inc.

Cyanox 1790 is 1,3,5-tris(4-tert-butyl-3-hydroxy-2,6-dimethylbenzyl)-1,3,5-triazine-2,4,6-(1H,3H,5H)-trione available from Cytec Industries Inc.

Naugard 445 is 4,4'-bis(alpha,alpha-dimethylbenzyl) diphenylene available from Chemtura (Crompton-Uniroyal Chemical).

Lowinox TBM-6 is 4,4'-thiobis(2-t-butyl-5-methylphenol available from Chemtura (Crompton-Uniroyal Chemical).

DCP is dicumyl peroxide available from Arkema.

Chimassorb 944 is poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)-imino]] available from Ciba Inc.

Chimassorb 119 is 10 wt % of dimethyl succinate polymer with 4-hydroxy-2,2,6,6,-tetramethyl-1-piperidineethanol and 90 wt % of N,N'''-[1,2-Ethanediylbis[[[4,6-bis[butyl(1,2,2,6,6-pentamethyl-4-piperidinyl)amino]-1,3,5-traizin-2-yl]imino]-3,1-propane-diyl]]bis[N'N''-dibutyl-N'N''-bis(1,2,2,6,6-pentamethyl-4-piperidinyl)]-1, and is commercially available from Ciba Inc.

AMSD is α-methyl styrene dimer available from Nippon Oil and Fat Company Ltd.

COMPARATIVE EXAMPLES 1-7 AND THE INVENTIVE EXAMPLE

The formulation of each example is reported in the tables. The formulation components are reported in weight percent based on the total weight of the composition.

Comparative Example 1

LDPE is melt compounded with PEG (Clariant 20000, Mw of 20,000) and thiobisphenol antioxidant (TBM6 available from Chemtura) at 160° C. in a Brabender batch mixer. The temperature is brought down to 120° C. and dicumyl peroxide (DCP) is added.

Comparative Example 2

Comparative Example 1 is repeated except Cyanox 1790 Cytec replaces the TBM-6.

Comparative Example 3

Comparative Example 1 is repeated except Irganox 1010 replaces the TBM-6.

Comparative Example 4

Comparative Example 1 is repeated except Irganox 1035 replaces the TBM6.

Comparative Example 5

Comparative Example 2 is repeated except Naugard 445 is used in combination with the Cyanox 1790.

Comparative Example 6

LDPE is melt compounded with PEG (Clariant 20000) and antioxidant (TBM-6) at 160° C. in an extruder to make pellets. The pellets are soaked at 40° C. in a Henchel blender with peroxide (DCP) and cure coagent (AMSD).

Comparative Example 7

Comparative Example 6 is repeated except secondary hindered amine stabilizer Chimasorb 944 is used in combination with TBM6.

Inventive Example

Comparative Example 6 is repeated except tertiary hindered amine stabilizer Chimasorb 119 is used in combination with TBM-6.

Results

Table 1 reports the performance of antioxidants with varying functionalities in a TRXLPE system (containing PEG). Simple phenolics such as Irganox 1010 are characterized by (i) a low tsl value at 140° C. signifying poor scorch resistance, and (ii) very poor long term heat aging properties as indicated by the retained peak stress and ultimate elongation values. Inclusion of nitrogen in the molecule via use of Cyanox 1790 or combination of Cyanox 1790 and Naugard 445 does not help in achieving the required heat aging properties. Inclusion of sulphur in the molecules lead to desired heat aging and cure properties as shown by the Mh (180° C.) and the retained mechanical property values of TBM-6 and Irganox 1035. The most desired balance in terms of cure and scorch retardance is achieved through the use of thiobisphenol (Inventive Example) as indicated by the ts1 and Mh values.

Table 2 reports the performance of thiobisphenol antioxidant with hindered amine stabilizer and AMSD in a TRXLPE system (containing PEG). Using the thiobisphenol along with AMSD (Comparative Example 6) provides the known characteristics of cure-boost and improved scorch retardance as indicated by 3.58 Mh at 180° C. and 74 min ts1 at 140° C. Selection of HALS based on steric crowding around pendant amines make a big difference in heat aging. Chimasorb 944 has pendant secondary amine groups which interact with the sulphur species from the antioxidant and result in poor heat aging performance (59% retained peak stress) although improvement in aged wet electrical properties is noted (Comparative Example 7). Pendant tertiary amine groups in Chimasorb 119 FL have minimal interaction and thus an acceptable balance of all the properties as indicated by the properties of the Inventive Example.

TABLE 1

Comparative Examples 1-5
Formulations, Cure, Scorch Retardancy and Heat Aging Balance of Antioxidants in TRXLPE

|  | CE-1 | CE-2 | CE-3 | CE-4 | CE-5 |
|---|---|---|---|---|---|
| LDPE | 99.03 | 98.92 | 98.79 | 98.74 | 99 |
| PEG | 0.6 | 0.6 | 0.6 | 0.6 | 0.6 |
| IRGANOX 1035 |  |  |  | 0.66 |  |
| IRGANOX 1010 |  |  | 0.61 |  |  |
| CYANOX 1790 |  | 0.48 |  |  | 0.3 |
| NAUGARD 445 |  |  |  |  | 0.1 |
| TBM-6 | 0.37 |  |  |  |  |
| Total Intermediate | 100 | 100 | 100 | 100 | 100 |
| Above Intermediate | 98.1 | 98.1 | 98.1 | 98.1 | 97.1 |
| DCP | 1.9 | 1.9 | 1.9 | 1.9 | 2.9 |
| Cure Properties |  |  |  |  |  |
| Mh180° C. (lb · in) | 3.22 | 3.12 | 3.76 | 3.42 | 3.19 |
| Ts1 140° C. (min) | 64 | 25 | 41 | 58 | 62 |
| Heat Aging @136° C. for 3 weeks |  |  |  |  |  |
| Retained Tensile Strength (%) | 100 | 0 | 0 | 100 | 0 |
| Retained Ultimate Elongation (%) | 100 | 0 | 0 | 100 | 0 |

TABLE 2

Comparative Examples 6-7 and Inventive Example
Formulations, Cure, Scorch Retardancy, Heat Aging Balance, Water-Tree Retardancy and Aged Wet-Electricals of Antioxidants in TRXLPE

|  | CE-6 | CE-7 | Inv. Ex. |
|---|---|---|---|
| LDPE | 99.13 | 98.93 | 98.93 |
| PEG | 0.5 | 0.5 | 0.5 |
| TBM-6 | 0.3 | 0.3 | 0.3 |
| CHIMASSORB 944 |  | 0.2 |  |
| CHIMASSORB 119 |  |  | 0.2 |
| Total | 100 | 100 | 100 |
| Above Intermediate | 97.84 | 97.84 | 97.84 |
| DCP | 1.8 | 1.8 | 1.8 |
| AMSD | 0.36 | 0.36 | 0.36 |
| Total | 100 | 100 | 100 |
| Cure Properties |  |  |  |
| Hot Creep (% Elongation) | 44.63 | 42.95 | 37.53 |
| Mh180° C. (lb · in) | 3.52 | 3.58 | 3.58 |
| Ts1 140° C. (min) | 74.08 | 72.11 | 71.86 |
| Heat Aging @136° C. for 3 weeks |  |  |  |
| Retained Tensile Strength (%) | 85 | 59 | 88 |
| Retained Ultimate Elongation (%) | 99 | 82 | 104 |
| Water Tree Retardancy |  |  |  |
| Water Tree Length (mm) | 0.2 | 0.26 | 0.21 |
| Aged Wet Electricals |  |  |  |
| Unaged ACBD (kV/mm) | 37.10 | 37.82 | 37.65 |
| Aged ACBD (kV/mm) | 33.48 | 35.41 | 35.09 |
| % Retained | 90.23 | 93.62 | 93.20 |

Although the invention has been described with certain detail through the preceding specific embodiments, this detail is for the primary purpose of illustration. Many variations and modifications can be made by one skilled in the art without departing from the spirit and scope of the invention as described in the following claims.

What is claimed is:

1. A composition of comprising:
   A. 10-99 wt % Ethylene-based polymer;
   B. 0.1-1 wt % Polyalkylene glycol;
   C. 0.1-1 wt % Tertiary hindered amine stabilizer;
   D. 0.1-1 wt % Sulphur-containing hindered phenol antioxidant which is a thiobisphenol;
   E. 0.1-3 wt % Peroxide; and
   F. 0-1 wt % Coagent.

2. The composition of claim 1 in which the ethylene-based polymer is LDPE and the polyalkylene glycol is polyethylene glycol with a Mw of 1,000 to 50,000.

3. The composition of claim 2 in which the tertiary hindered amine stabilizer is at least one of bis(2,2,6,6-tetramethyl-4-piperidyl) sebaceate, T dimethyl-ester 4-hydroxy-2,2,6,6-tetramethyl-piperidine ethanol, bis-(1,2,2,6,6-pentamethyl-4-piperidinyl)- 2-n-butyl-2-(3,5-di-tert-butyl-4-hydroxybenzy)malonate, [(4-methoxyphenyl)-methylen]-bis-(1,2,2,6,6-pentamethyl-4- piperidiny)ester and a mixture of 10 wt % dimethyl succinate polymer with 4-hydroxy-2,2,6,6tetramethyl-1piperidineethanol and 90 wt % of N,N'''-[1,2-ethanediylbis [[[4,6-bis[butyl(1,2,2,6,6-pentamethyl-4-piperidiny)amino]-1,3,5-traizin-2-yl]imino]-3,1-propanediyl]]bis[N,N''-dibutyl-N'N''-bis(1,2,2,6,6-pentamethyl-4-piperidinyl)]1.

4. The composition of claim 3 in which the sulphur-containing hindered phenol antioxidant is at least one of 4,4'-thiobis(2-methyl-6-tert-butylphenol), 4,4'-thiobis(2-tert-butyl-5-methylphenol), and 2,2'-thiobis(4-methyl-6-tert-butylphenol).

5. The composition of claim 4 in which the coagent is present and is at least one of triallyl isocyanurate; ethoxylated bisphenol A dimethacrylate; and α-methyl styrene dimer.

6. The composition of claim 4 in which the sulphur-containing hindered phenol antioxidant is 4,4'-thiobis(2-tert-butyl-5-methylphenol).

7. The composition of claim 2 in which the tertiary hindered amine stabilizer is a mixture of 10 wt % dimethyl succinate polymer with 4-hydroxy-2,2,6,6-tetramethyl-1-piperidineethanol and 90 wt % of N,N'''-[1,2-ethanediylbis[[[4,6-bis[butyl(1,2,2,6,6-pentamethyl-4-piperidinyl)amino]-1,3,5-traizin-2-yl]imino]-3,1-propane-diyl]]bis[N,N''-dibutyl-N'N''-bis(1,2,2,6,6-pentamethyl-4-piperidinyl)]-1.

8. An insulation covering for medium voltage cable, the insulation covering made from the composition of claim 1.

9. The insulation covering of claim 8 as a component of a tree-resistant, crosslinked polyethylene medium voltage cable.

\* \* \* \* \*